United States Patent
Shimizu et al.

(10) Patent No.: US 11,493,443 B2
(45) Date of Patent: Nov. 8, 2022

(54) LIGHT ABSORBANCE ANALYSIS APPARATUS AND PROGRAM RECORD MEDIUM FOR RECORDING PROGRAMS OF LIGHT ABSORBANCE ANALYSIS APPARATUS

(71) Applicant: HORIBA STEC, Co., Ltd., Kyoto (JP)

(72) Inventors: Toru Shimizu, Kyoto (JP); Yuhei Sakaguchi, Kyoto (JP); Masakazu Minami, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 101 days.

(21) Appl. No.: 16/849,381

(22) Filed: Apr. 15, 2020

(65) Prior Publication Data
US 2020/0340918 A1 Oct. 29, 2020

(30) Foreign Application Priority Data
Apr. 26, 2019 (JP) .............................. JP2019-085100

(51) Int. Cl.
*G01N 21/61* (2006.01)

(52) U.S. Cl.
CPC ....... *G01N 21/61* (2013.01); *G01N 2201/127* (2013.01)

(58) Field of Classification Search
CPC ........................... G01N 21/93; G01N 33/0006
See application file for complete search history.

(56) References Cited

U.S. PATENT DOCUMENTS

| | | | | |
|---|---|---|---|---|
| 3,685,346 A | * | 8/1972 | Molloy | G01N 27/4163 204/406 |
| 4,205,913 A | * | 6/1980 | Ehrfeld | G01N 21/3504 250/343 |
| 4,336,031 A | * | 6/1982 | Hopmeier | A61B 5/1495 436/19 |
| 5,046,018 A | * | 9/1991 | Flewelling | A61B 5/083 702/24 |
| 5,886,348 A | * | 3/1999 | Lessure | G01N 21/3504 250/339.04 |

(Continued)

FOREIGN PATENT DOCUMENTS

JP 2014-224307 A 12/2014

*Primary Examiner* — Dominic J Bologna
*Assistant Examiner* — Jarreas C Underwood
(74) *Attorney, Agent, or Firm* — Greenblum & Bernstein, P.L.C.

(57) ABSTRACT

In order to make it possible to conduct a zero calibration even though an interference gas exists in a measurement area of a detector, a light absorbance analysis apparatus includes a detector that detects an intensity of light that transmits a gas, a total pressure sensor that measures a total pressure of the gas, an absorbance calculating part that calculates an absorbance based on an output value of the detector and a previously set zero reference value, a partial pressure—absorbance relation storing part that stores a partial pressure—absorbance relational data that indicates a relationship between a partial pressure of an interference gas that exists in a measurement area of the detector and an absorbance calculated by the absorbance calculating part, and a partial pressure calculating part that calculates an interference gas partial pressure as a partial pressure of the interference gas.

5 Claims, 5 Drawing Sheets

(56) References Cited

U.S. PATENT DOCUMENTS

| | | | |
|---|---|---|---|
| 2007/0034792 A1* | 2/2007 | Zhang | G01N 21/3504 250/252.1 |
| 2013/0135619 A1* | 5/2013 | Hirata | G01N 21/3504 356/409 |
| 2014/0319705 A1* | 10/2014 | Hayashi | G05D 11/138 261/43 |
| 2015/0323468 A1* | 11/2015 | Nakano | G01N 33/182 422/86 |

* cited by examiner

LIGHT ABSORBANCE ANALYSIS APPARATUS AND PROGRAM RECORD MEDIUM FOR RECORDING PROGRAMS OF LIGHT ABSORBANCE ANALYSIS APPARATUS

FIELD OF THE ART

This invention relates to a light absorbance analysis apparatus and a program record medium that stores programs for the light absorbance analysis apparatus.

BACKGROUND ART

Conventionally, a light absorbance analysis apparatus that is incorporated into a semiconductor manufacturing line and that measures a concentration of a material gas supplied to a chamber of a film forming equipment comprises a detector that detects an intensity of light that transmits a gas and a total pressure sensor that measures a total pressure of the gas.

The detector comprises, for example, a light source that irradiates the light on a gas, a filter that transmits the light having a wavelength (hereinafter also called as a measurement wavelength) that is absorbed by a material gas among the light emitted from the light source and a light receiving part that detects the intensity of the light having the measurement wavelength that transmits the gas.

Meanwhile, in case of conducting a zero calibration on the detector for a conventional light absorbance analysis apparatus, it is necessary to create a state wherein no gas (hereinafter also called as an interference gas) that absorbs the light having the measurement wavelength exists in a measurement area of the detector. Then, the conventional light absorbance apparatus conducts the zero calibration on the detector by creating the state by evacuating the detector or by purging the detector by the use of the gas (for example, $N_2$ gas) that does not absorb the light having the measurement wavelength.

However, in some semiconductor manufacturing line into which the conventional light absorbance analysis apparatus is incorporated, there may be a case wherein it is not possible to create the state for reasons of a process. In this case, it is not possible to conduct the zero calibration on the detector. If the state wherein it is not possible to conduct the zero calibration on the detector continues for a long period of time, there is a problem that the measurement accuracy drops due to an increased influence of drift.

PRIOR ART DOCUMENTS

Patent Document

[Patent document 1] Japanese Unexamined Patent Application Publication No. 2014-224307

DISCLOSURE OF THE INVENTION

Problems to be Solved by the Invention

A main object of this invention is to make it possible to conduct a zero calibration on a detector of a light absorbance analysis apparatus even though an interference gas exists in a measurement area of the detector.

Means to Solve the Problems

More specifically, a light absorbance analysis apparatus in accordance with this invention comprises a detector that detects an intensity of light that transmits a gas, a total pressure sensor that measures a total pressure of the gas, an absorbance calculating part that calculates an absorbance based on an output value of the detector and a previously set zero reference value, a partial pressure—absorbance relation storing part that stores a partial pressure—absorbance relational data that indicates a relationship between a partial pressure of an interference gas that exists in a measurement area of the detector and the absorbance calculated by the absorbance calculating part at a time of zero calibration, a partial pressure calculating part that calculates an interference gas partial pressure, in a known concentration state wherein the interference gas whose concentration is known exists in the measurement area, based on the total pressure measured by the total pressure sensor and the known concentration, an absorbance estimating part that estimates an interference gas absorbance based on the interference gas partial pressure and the partial pressure—absorbance relational data, and a calibrating part that conducts the zero calibration that updates the zero reference value based on the interference gas absorbance and the output value of the detector in the known concentration state.

In accordance with this arrangement, in the known concentration state wherein the interference gas whose concentration is known exists in the measurement area of the detector, since the interference gas partial pressure is calculated based on the total pressure measured by the total pressure sensor and the known concentration, the interference gas absorbance is estimated based on the interference gas partial pressure and the partial pressure—absorbance relational data indicating a relationship between a previously stored interference gas partial pressure and the light absorbance, and the zero calibration is conducted to update the zero reference value based on the interference gas absorbance and the output value of the detector in the known concentration state, it is possible to conduct the zero calibration without creating a state wherein no interference gas exists in the measurement area of the detector. As a result of this, it is possible to conduct the zero calibration on a regular basis without halting the process so that it is possible to keep the analysis accuracy of the light absorbance analysis apparatus.

The interference gas used for conducting the zero calibration in this invention is a gas that absorbs the light having the measurement wavelength in a measurement area of the detector and whose concentration is known.

In addition, as a concrete arrangement of the calibrating part represented is the calibrating part that conducts the zero calibration to update the zero reference value to $I_0$ calculated based on the following mathematical expression 1.

$$I_0 = I \times 10^{-A} \quad \text{[Mathematical expression 1]}$$

Wherein, I is the output value of the detector detected in the known concentration state, and A is the interference gas absorbance In addition, in case of conducting span calibration on the detector in addition to the zero calibration, it is preferable that the absorbance calculating part calculates a normalized absorbance based on the output value of the detector, the zero reference value and a previously set span absorbance, the partial pressure—absorbance relation storing part stores a partial pressure— normalized absorbance relational data that indicates a relationship between the interference gas partial pressure that exists in the measurement area of the detector and the normalized absorbance calculated by the absorbance calculating part at the time of the zero calibration, the partial pressure calculating part calculates the interference gas partial pressure in a first partial pressure state wherein the interference gas having the known concentration at a partial pressure exists in the measurement area and the interference gas partial pressure in a second partial pressure state wherein the interference gas at another pressure, the absorbance estimating part estimates an interference gas normalized absorbances in the first partial pressure state and in the second partial pressure state based on each of the interference gas partial pressures in the first partial pressure state and in the second partial pressure state and the partial pressure— normalized absorbance relational data, and the calibrating part conducts the zero calibration that updates the zero reference value and a span calibration that updates the span absorbance based on each of the interference gas normalized absorbance in the first partial pressure state and the interference gas normalized absorbance in the second partial pressure state and the output value of the detector in the first partial pressure state and the output value of the detector in the second partial pressure state.

In accordance with this arrangement, it is possible to conduct not only the zero calibration but also the zero calibration without creating a state wherein no interference gas exists in the measurement area of the detector. As a result of this, it is possible to conduct the zero calibration on a regular basis without halting a process so that it is possible to keep the analysis accuracy of the light absorbance analysis apparatus.

In addition, a concrete arrangement of the detector represented is that wherein the calibrating part conducts the span calibration that updates the span absorbance to $A_s$ calculated from the following mathematical expression 2 and the zero calibration that updates the zero reference value to $I_0$ calculated from the following mathematical expressions 2 and 3.

$$A_s = \log(I_1/I_2)/(A_{r2} - A_{r1})$$ [Mathematical expression 2]

$$I_0 = I_1 \times 10^{A_s \cdot A_{r1}} \text{ or } I_0 = I_2 \times 10^{A_s \cdot A_{r2}}$$ [Mathematical expression 3]

Wherein, $A_{r1}$ is the interference gas normalized absorbance in the first partial pressure state, $A_{r2}$ is the interference gas normalized absorbance in the second partial pressure state, $I_1$ is the output value of the detector detected in the first partial pressure state and $I_2$ is the output value of the detector detected in the second partial pressure state.

In addition, a program for a light absorbance analysis apparatus in accordance with this invention is used for a light absorbance apparatus that comprises a detector that detects an intensity of light that transmits a gas, a total pressure sensor that measures a total pressure of the gas, and an absorbance calculating part that calculates an absorbance based on an output value of the detector and a previously set zero reference value, and that produces functions as a partial pressure— absorbance relation storing part that stores a partial pressure— absorbance relational data that indicates a relationship between a partial pressure of an interference gas that exists in a measurement area of the detector and the absorbance calculated by the absorbance calculating part at a time of zero calibration, a partial pressure calculating part that calculates an interference gas partial pressure, in a known concentration state wherein the interference gas whose concentration is known exists in the measurement area, based on the total pressure measured by the total pressure sensor and the known concentration, an absorbance estimating part that estimates an interference gas absorbance based on the interference gas partial pressure and the partial pressure— absorbance relational data, and a calibrating part that conducts the zero calibration that updates the zero reference value based on the interference gas absorbance and the output value of the detector in the known concentration state. The program for light absorbance analysis apparatus may be electrically distributed, or may be stored in a program record medium such as a CD, DVD and a flash memory.

In accordance with the light absorbance apparatus having this arrangement, it is possible to conduct the zero calibration on the detector without creating a state wherein no interference gas exists in the measurement area of the detector.

BEST MODES OF EMBODYING THE INVENTION

A light absorbance analysis apparatus in accordance with this invention will be explained with reference to drawings.

The light absorbance analysis apparatus in accordance with this invention is used by being incorporated into, for example, a semiconductor manufacturing line. More concretely, the light absorbance analysis apparatus is used to measure a concentration of a gas that is produced by the vaporizer of the semiconductor manufacturing line and that is supplied to a chamber. In the following embodiment, the light absorbance analysis apparatus in a state of being installed in the vaporizer will be explained.

Embodiment

Figure 1:
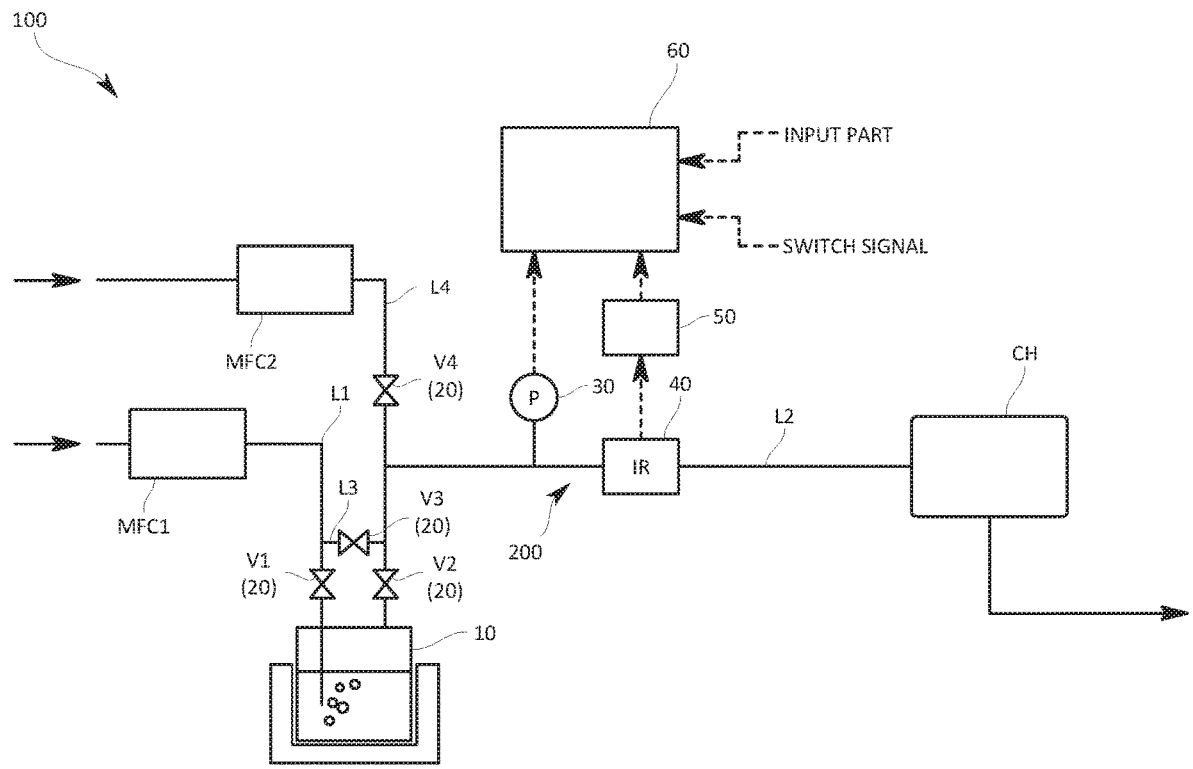
FIG. 1 A pattern diagram showing a vaporizer to which a light absorbance analysis apparatus in accordance with an embodiment is connected.

First, the vaporizer 100 in accordance with this embodiment will be explained. The vaporizer 100 is, so called, a dilution type (a flow rate type). Concretely, as shown in FIG. 1, the vaporizer 100 comprises a vaporizing tank 10 that stores a liquid or solid material, a carrier gas supplying line (L1) that supplies a carrier gas to the vaporizing tank 10, a material gas discharging line (L2) that discharges a material gas from the vaporizing tank 10 and supplies the material gas to the chamber (CH), a bypass flow channel (L3) that connects the carrier gas supplying line (L1) and the material gas discharging line (L2), a dilution gas supplying line (L4) that supplies a dilution gas that dilutes the material gas to the material gas discharging line (L2), and a switching mechanism 20 that switches from a material gas supplying mode to supply the material gas to the chamber (CH) to a carrier gas supplying mode to supply only the carrier gas to the chamber (CH) and vice versa.

The carrier gas supplying line (L1) is provided with a first flow rate control unit (MFC1) that controls a flow rate of the carrier gas. The first flow rate control unit (MFC1) is a mass flow controller comprising, for example, a thermal type flow rate sensor, a flow rate adjusting valve such as a piezoelectric valve and a control circuit having a CPU and a memory. The carrier gas supplying line (L1) supplies the carrier gas containing an interference gas having a known concentration.

The material gas discharging line L2 is provided with a light absorbance analysis apparatus 200 to be described later. Concretely, the light absorbance analysis apparatus 200 is arranged in the downstream side of a connecting part between the dilution gas supplying line (L4) and the material gas discharging line (L2).

The dilution gas supplying line (L4) is provided with a second flow rate control unit (MFC2) that controls a flow rate of the dilution gas. Similar to the first flow rate control unit (MFC1), the second flow rate control unit (MFC2) is a mass flow controller comprising, for example, a thermal type flow rate sensor, a flow rate adjusting valve such as a piezoelectric valve and a control circuit having a CPU and a memory.

The switching mechanism 20 has several valves (V1)~(V4) that open/close by receiving a valve switch signal. For example, when a user opens/closes the valve (V1) (V4) of the switching mechanism 20 at a previously set timing, the material gas supplying mode is switched to the carrier gas supplying mode and vise versa.

Concretely, the switching mechanism 20 comprises the first valve (V1) arranged in the downstream side of a connecting point between the carrier gas supplying line (L1) and the bypass flow channel (L3), the second valve (V2) arranged in the upstream side of a connecting point between the material gas discharging line (L2) and the bypass flow channel (L3), the third valve (V3) arranged in the bypass flow channel (L3) and the forth valve (V4) arranged in the dilution gas supplying line (L4).

Then, the switching mechanism 20 switches to the material gas supplying mode to supply the material gas from the material gas discharging line (L2) to the chamber (CH) by both opening the first valve (V1), the second valve (V2) and the forth valve (V4) and closing the third valve (V3).

On the other hand, the switching mechanism 20 switches to the carrier gas supplying mode to supply only the carrier gas from the material gas discharging line (L2) to the chamber (CH) by both closing the first valve (V1), the second valve (V2) and the forth valve (V4) and opening the third valve (V3).

The vaporizer 100 comprises a concentration control part, not shown in drawings, that feed-back controls the first flow rate control unit (MFC1) and the second flow rate control unit (MFC2) so as to approach the concentration of the material gas measured by the light absorbance analysis apparatus 200 to a previously determined set concentration when switched to the material gas supplying mode.

Next, the light absorbance analysis apparatus 200 in accordance with this embodiment will be explained. The light absorbance analysis apparatus 200 comprises a total pressure sensor 30 and a detector 40 arranged in the material gas discharging line (L2), an absorbance calculating part 50 that calculates the absorbance based on an output value of the detector 40 and a control part 60. The detector 40 is arranged in the downstream side of the total pressure sensor 30.

The total pressure sensor 30 measures a total pressure of a gas flowing in the material gas discharging line L2.

Figure 2:
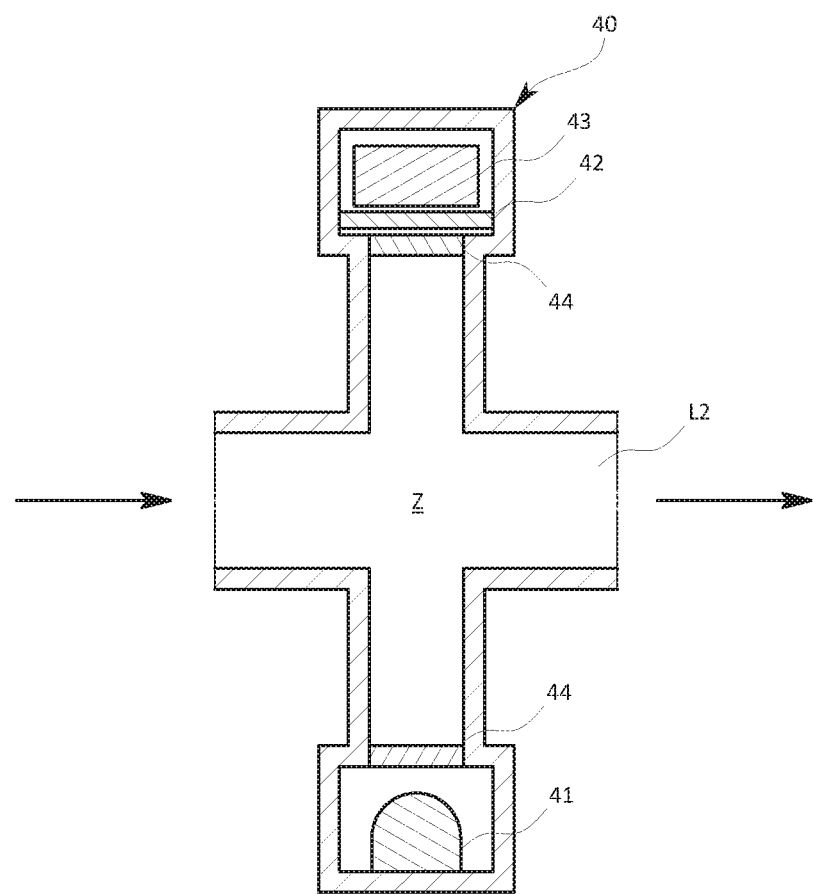
FIG. 2 A pattern diagram showing a detector in accordance with this embodiment.

The detector 40 detects an intensity of the light penetrating the gas flowing in the material gas discharging line L2. Concretely, the detector 40 comprises, as shown in FIG. 2, a light source 41 that irradiates the light on the gas flowing in the material gas discharging line (L2), a filter 42 that transmits the light having a wavelength (hereinafter also called as a measurement wavelength) absorbed by the material gas (a measurement object gas) among the wavelength of the light irradiated from the light source 41, and a light receiving part 43 that detects the intensity of the light having the measurement wavelength that transmits the filter 42. In case that an area, in the material gas discharging line (L2), where the light irradiated from the light source 41 transmits is set to be the measurement area (Z), the detector 40 is so arranged that the light source 41 is arranged in one side of the measurement area (Z) and the filter 42 and the light receiving part 43 are arranged in the other side of the measurement area (Z). In addition, a window member 44 is arranged between the light source 41 and the material gas discharging line (L2) and between the filter 42 and the material gas discharging line (L2) respectively. With this arrangement, the light source 41, the filter 42 and the light receiving part 43 do not directly make contact with the gas flowing in the material gas discharging line (L2). Then, the detector 40 outputs the output signal that indicates the intensity of the light passing the gas existing in the measurement area (Z) and that is output by the light receiving part 43 as the output value.

Figure 3:
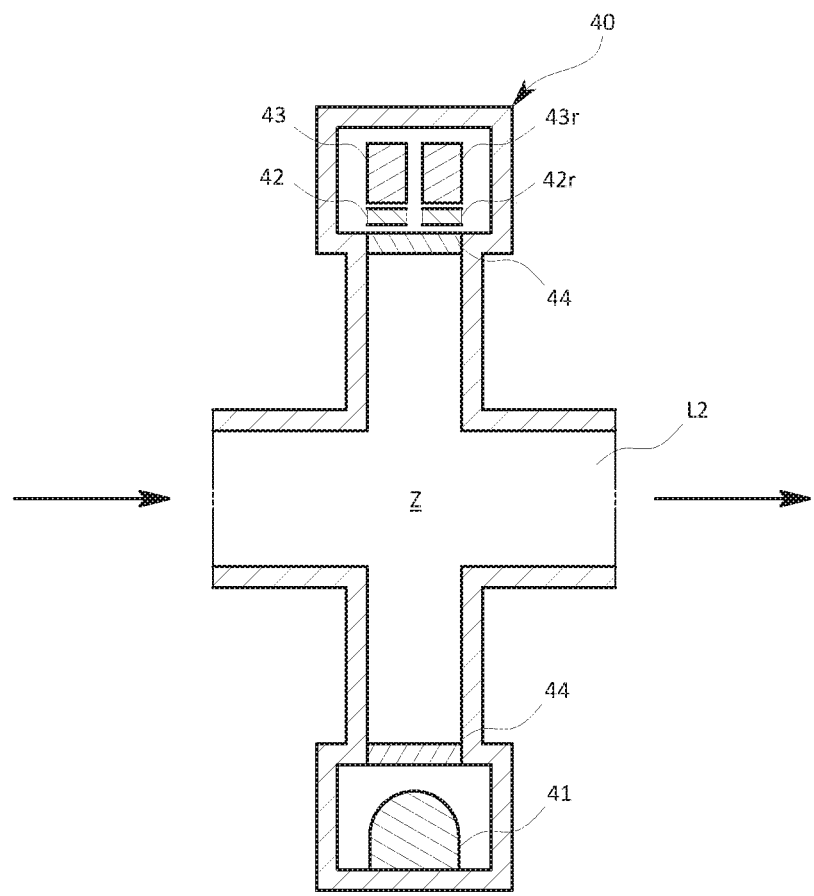
FIG. 3 A pattern diagram showing a modified example of the detector in accordance with this embodiment.

In addition to the filter 42 and the light receiving part 43 in the other side of the measurement area (Z), as shown in FIG. 3, the detector 40 may comprise a filter for reference 42r that transmits the light having the wavelength that is not absorbed by the material gas and a light receiving part for reference 43r that detects the intensity of the light having the wavelength that transmits the filter for reference 42r. In this case, a ratio of the output signal of the light receiving part 43 to the output signal of the light receiving part for reference 43r may be used as the output value of the detector 40.

In addition, the absorbance calculating part 50 calculates the absorbance based on the output value of the detector 40 and the previously set zero reference value. The zero reference value is the output value of the detector 40 detected in a state wherein there exists no interference gas. Concretely, the absorbance calculating part 50 calculates the absorbance (A) based on the following mathematical expression 4.

$$A=\log(I_0/I) \qquad \text{[Mathematical expression 4]}$$

Wherein, I is an output value of the detector, $I_0$ is a zero reference value.

The control part 60 conducts the zero calibration to update the zero reference value in case that the control part 60 receives the zero calibration execution signal. The control part 60 conducts the zero calibration in a state wherein the vaporizer 100 is switched to the carrier gas supplying mode, in other words, in a state wherein the carrier gas containing the interference gas having a known concentration is supplied from the material gas discharging line (L2) to the chamber (CH). Concretely, after the vaporizer 100 is switched to the carrier gas supplying mode, the control part 60 conducts the zero calibration by receiving the zero calibration execution signal transmitted from the vaporizer 100 to the control part 60 at a time when the pressure is sufficiently stabilized.

Figure 4:
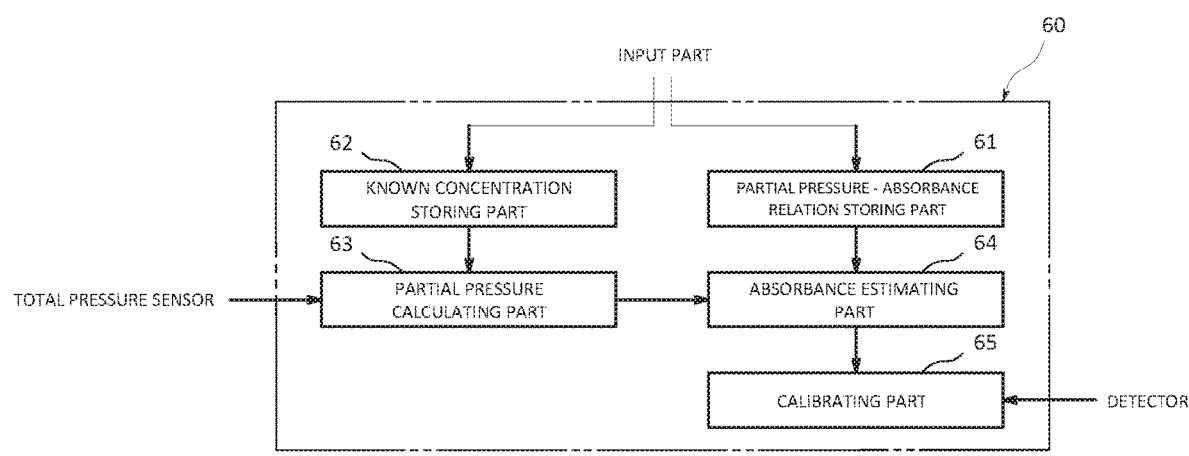
FIG. 4 A block diagram showing a light absorbance analysis apparatus in accordance with this embodiment.
Figure 5:
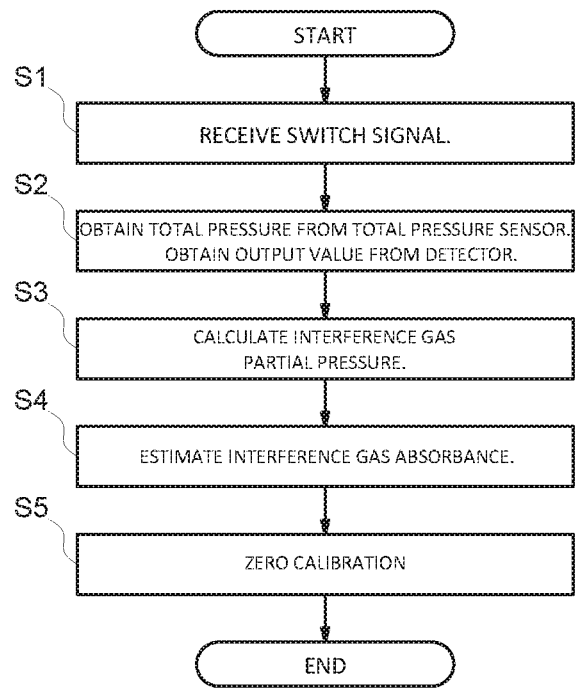
FIG. 5 A flow chart showing an operation of the light absorbance analysis apparatus in accordance with this embodiment.

Concretely, the control part 60 is connected to the total pressure sensor 30 and the detector 40, and is a computer having a CPU, a memory, an AD converter, a DA converter and an input part. As shown in FIG. 4, the control part 60 produces functions as a partial pressure—absorbance relation storing part 61, a known concentration storing part 62, a partial pressure calculating part 63, an absorbance estimating part 64 and a calibrating part 65 by running the programs stored in the memory by the CPU.

The partial pressure— absorbance relation storing part 61 stores a partial pressure— absorbance relational data indicating a relationship between the partial pressure of the interference gas existing in the measurement area (Z) of the detector 40 and the absorbance calculated by the absorbance calculating part 50 at a time of the zero calibration. The partial pressure— absorbance relation storing part 61 in accordance with this embodiment stores a partial pressure— absorbance relational data indicating a relationship between the partial pressure of the interference gas obtained prior to shipping of the light absorbance analysis apparatus 200 and the absorbance.

The known concentration storing part 62 stores the known concentration of the interference gas. The known concentration storing part 62 in accordance with this embodiment stores the known concentration of the interference gas contained in the carrier gas supplied from the carrier gas supplying line (L1). The concentration may be any value selected from 0~100%.

The partial pressure calculating part 63 calculates the interference gas partial pressure based on the total pressure measured by the total pressure sensor 30 and the known concentration of the interference gas stored in the known concentration storing part 62 in the known concentration state wherein the interference gas having the known concentration exists in the measurement area (Z) of the detector 40. The partial pressure calculating part 63 in accordance with this embodiment calculates the interference gas partial pressure in case of receiving the zero calibration executing signal.

The absorbance estimating part 64 estimates the interference gas absorbance based on the interference gas partial pressure calculated by the partial pressure calculating part 63 and the partial pressure— absorbance relational data stored in the partial pressure— absorbance relation storing part 61. The absorbance estimating part 64 estimates the absorbance of the interference gas contained in the carrier gas.

The calibrating part 65 conducts the zero calibration to update the zero reference value based on the interference gas absorbance estimated by the absorbance estimating part 64 and the output value detected by the detector 40 in the known concentration state wherein the interference gas whose concentration is known exists in the measurement area (Z). Concretely, the calibrating part 65 calculates ($I_0$) by substituting the interference gas absorbance (A) estimated by the absorbance estimating part 64 and the output value (I) of the detector 40 detected in the known concentration state in the mathematical expression 1, and conducts the zero calibration to update the zero reference value to ($I_0$).

Next, a calibration operation of the light absorbance analysis apparatus 200 in accordance with this embodiment will be explained.

First, the light absorbance analysis apparatus 200 receives the zero calibration execution signal from the vaporizer 100 (step S1). Then, the partial pressure calculating part 63 obtains the total pressure of the carrier gas measured by the total pressure sensor 35 and the calibrating part 65 obtains the output value (I) of the detector 40 (step S2).

Next, the partial pressure calculating part 63 calculates the interference gas partial pressure contained in the carrier gas based on the obtained total pressure and the known concentration of the interference gas contained in the carrier gas stored in the known concentration storing part 62 (step S3).

Next, the absorbance estimating part 64 estimates the interference gas absorbance contained in the carrier gas based on the interference gas partial pressure calculated by the partial pressure calculating part 53 and the partial pressure— absorbance relational data stored in the partial pressure— absorbance relation storing part 61 (step S4).

Then, the calibrating part 65 calculates the ($I_0$) by substituting the obtained output value (I) of the detector 40 and the interference gas absorbance (A) estimated by the absorbance estimating part 64 in the mathematical expression 1 and conducts the zero calibration to update the zero reference value to the ($I_0$) (step S5).

In accordance with this arrangement, in spite of a process to continuously supply either one of the carrier gas and the material gas to the chamber (CH) from the vaporizer 100 on a constant basis, it is possible to conduct the zero calibration of the detector 40 in a state wherein the vaporizer 100 is switched to the carrier gas supplying mode. As a result of this, it is possible to maintain the measurement accuracy of the light absorbance analysis apparatus 200.

In case of conducting the zero calibration of the detector 40 of this embodiment, a state may be created wherein the gas containing the interference gas whose concentration is known flows in the material gas discharging line (L2) where the light absorbance analysis apparatus 200 is placed.

Then, it is possible to conduct the zero calibration on the detector 40 even if the detector 40 is of the following modified arrangement. More specifically, for example, a dilution gas whose component is the same as that of the carrier gas is supplied from a dilution gas supplying line (L4). Then, the material gas supplying mode to supply the material gas to the chamber (CH) and the dilution gas supplying mode to supply only the dilution gas to the chamber (CH) can be switched by the switching mechanism 20. Also in accordance with this arrangement, it is possible to create a state wherein the dilution gas containing the interference gas whose concentration is known flows from the material gas discharging line (L2) to the chamber (CH) by switching the vaporizer 100 from the dilution mode to the supplying mode and vice versa so that the zero calibration can be conducted on the detector 40.

Furthermore, it is so configured that the material gas supplying mode to supply the material gas to the chamber (CH) and a mixed gas supplying mode to supply a mixed gas to the chamber (CH) wherein the carrier gas and the dilution gas are mixed with a known ratio can be switched by the switching mechanism 20. Also in accordance with this arrangement, it is possible to make a state wherein the mixed gas that contains the interference gas having the known concentration flows from the material gas discharging line (L2) to the chamber (CH) by switching the vaporizer 200 to the mixed gas supplying mode so that the zero calibration can be conducted on the detector 40.

In the above-mentioned embodiment, the zero calibration is conducted in a state wherein the gas containing the interference gas having the known concentration flows from the material gas discharging line (L2) to the chamber (CH), however, the zero calibration may be conducted in a state wherein the upstream side of the total pressure sensor 30 and the downstream side of the detector 40 are closed by the open/close valve, not shown in drawings, after the gas flows in the material gas discharging line (L2).

Other Embodiment

As another embodiment represented is that the absorbance calculating part 50 calculates the normalized absorbance based on the output value of the detector 40, the previously set zero reference value and a previously set span absorbance, and the calibrating part 65 conducts span calibration that updates a span absorbance in addition to the zero calibration that updates the zero reference value. In this case, concretely the absorbance calculating part 50 calculates the normalized absorbance (Ar) from the following mathematical expression 5.

$$A_r = \log(I_0/I)/A_s \quad \text{[Mathematical expression 5]}$$

Wherein, I is the output value of the detector, $I_0$ is the zero reference value, and the $A_s$ is the span absorbance.

Concretely, in the above-mentioned embodiment, in a state wherein the vaporizer 100 is switched to the carrier gas supplying mode, a first partial pressure state wherein the carrier gas is supplied to the material gas discharging line (L2) in a condition wherein the interference gas becomes in a certain partial pressure, and a second partial pressure state wherein the carrier gas is supplied to the material gas discharging line (L2) in a condition wherein the interference gas becomes in another partial pressure are created. Concretely, the first partial pressure state and the second partial pressure state are created by changing the pressure of the carrier gas supplied from the carrier gas supplying channel (L1) or by changing the concentration of the interference gas contained in the carrier gas supplied from the carrier gas supplying channel (L1).

In addition, a partial pressure— normalized absorbance relation data indicating a relationship between the partial pressure of the interference gas existing in the measurement area (Z) and the normalized absorbance calculated by the absorbance calculating part 50 at a time of the zero calibration is stored in the partial pressure— absorbance relation storing part 61.

The partial pressure calculating part 63 calculates the interference gas partial pressure in the first partial pressure state and the interference gas partial pressure in the second partial pressure state respectively, the absorbance estimating part 64 estimates the interference gas normalized absorbances in the first partial pressure state and in the second partial pressure state based on each of the interference gas partial pressures and the partial pressure— normalized absorbance relation data, and the calibrating part 65 conducts the zero calibration to update the zero reference value and the span calibration to update the span absorbance based on each of the interference gas normalized absorbance, the output value of the detector 40 in the first partial pressure state and the output value of the detector 40 in the second partial pressure state.

Concretely, the calibrating part 65 may calculate ($I_0$) and ($A_s$) by substituting the output value ($I_1$) of the detector 40 and the interference gas normalized absorbance ($A_{r1}$) in the first partial pressure state, the output value ($I_2$) of the detector 40 and the interference gas normalized absorbance ($A_{r2}$) in the second partial pressure state in the mathematical expressions 2 and 3 so as to conduct the zero calibration to update the zero reference value to ($I_0$), and the span calibration to update the span absorbance to ($A_s$).

In addition, as another embodiment, the vaporizer 100 may separately comprise the interference gas supplying line to supply the interference gas having the known concentration to the material gas discharging line (L2). In this case the interference gas may be any as far as the concentration of the interference gas is known. For example, the interference gas may be a gas whose component is the same as that of the material gas, or may be a gas whose component is the same as that of the carrier gas or may be other gas for calibration.

In addition, it is a matter of course that the present claimed invention is not limited to the above-mentioned embodiment and may be variously modified without departing from a spirit of the invention.

Explanation of Codes

100 vaporizer
10 vaporizing tank
L1 carrier gas supplying line
L2 material gas discharging line
L3 bypass flow channel
L4 dilution gas supplying line
20 switching mechanism
MFC1 first flow rate control unit
MFC2 second flow rate control unit
200 light absorbance analysis apparatus
30 total pressure sensor
40 detector
50 absorbance calculating part
60 control unit
61 partial pressure—absorbance relation storing part
62 known concentration storing part
63 partial pressure calculating part
64 absorbance estimating part
65 calibrating part

The invention claimed is:
1. A light absorbance analysis apparatus, comprising:
a detector that detects an intensity of light that transmits a gas,
a total pressure sensor that measures a total pressure of the gas, and
a controller, including a processor and a memory storing a program, which when executed by the processor, performs operations, including:
calculating an absorbance based on an output value of the detector and a previously set zero reference value,
storing a partial pressure—absorbance relational data that shows a relationship between a partial pressure of an interference gas that exists in a measurement area of the detector and the calculated absorbance,
calculating an interference gas partial pressure, in a known concentration state, wherein the interference gas whose concentration is known exists in the measurement area, based on the total pressure measured by the total pressure sensor and the known concentration,
estimating an interference gas absorbance based on the interference gas partial pressure and the partial pressure—absorbance relational data, and
conducting the zero calibration that updates the zero reference value based on the interference gas absorbance and the output value of the detector in the known concentration state,
wherein the light absorbance analysis apparatus conducts the zero calibration on the detector even when the interference gas exists in the measurement area of the detector.
2. The light absorbance analysis apparatus described in claim 1,
wherein the operations further include conducting the zero calibration that updates the zero reference value to $I_0$ calculated based on the following mathematical expression 1:

$$I_0 = I \times 10^A \quad \text{[Mathematical expression 1]}$$

I: the output value of the detector detected in the known concentration state, and A: the interference gas absorbance.

3. The light absorbance analysis apparatus described in claim 1, wherein the operations further include:
calculating a normalized absorbance based on the output value of the detector, the zero reference value and a previously set span absorbance,
storing a partial pressure—normalized absorbance relational data that shows a relationship between the interference gas partial pressure that exists in the measurement area of the detector and the calculated normalized absorbance,
calculating the interference gas partial pressure in a first partial pressure state wherein the interference gas having the known concentration at a partial pressure exists in the measurement area, and the interference gas partial pressure in a second partial pressure state, wherein the interference gas at another partial pressure,
estimating interference gas normalized absorbances in the first partial pressure state and in the second partial pressure state based on each of the interference gas partial pressures in the first partial pressure state and in the second partial pressure state and the partial pressure—normalized absorbance relational data, and
conducting the zero calibration that updates the zero reference value and a span calibration that updates the span absorbance based on each of the interference gas normalized absorbance in the first partial pressure state and the interference gas normalized absorbance in the second partial pressure state and the output value of the detector in the first partial pressure state and the output value of the detector in the second partial pressure state.

4. The light absorbance analysis apparatus described in claim 3, wherein the operations further include conducting the span calibration that updates the span absorbance to $A_s$ calculated from the following mathematical expression 2 and the zero calibration that updates the zero reference value to $I_0$ calculated from the following mathematical expressions 2 and 3:

$$A_s = \log(I_1/I_2)/(A_{r2}-A_{r1}) \quad \text{[Mathematical expression 2]}$$

$$I_0 = I_1 \times 10^{A_s \cdot A_{r1}} \text{ or } I_0 = I_2 \times 10^{A_s \cdot A_{r2}} \quad \text{[Mathematical expression 3]}$$

$A_{r1}$: the interference gas normalized absorbance in the first partial pressure state,
$A_{r2}$: the interference gas normalized absorbance in the second partial pressure state,
$I_1$: the output value of the detector detected in the first partial pressure state, and
$I_2$: the output value of the detector detected in the second partial pressure state.

5. A non-transitory program recording media, the media comprising:

a recorded program used for a light absorbance analysis apparatus, the apparatus including a detector that detects an intensity of light that transmits a gas, a total pressure sensor that measures a total pressure of the gas, and a controller, including a processor and a memory storing a program, which when executed by the processor, performs operations, including:
calculating an absorbance based on an output value of the detector and a previously set zero reference value,
storing a partial pressure—absorbance relational data that shows a relationship between a partial pressure of an interference gas that exists in a measurement area of the detector and the calculated absorbance,
calculating an interference gas partial pressure, in a known concentration state, wherein the interference gas whose concentration is known exists in the measurement area, based on the total pressure measured by the total pressure sensor and the known concentration,
estimating an interference gas absorbance based on the interference gas partial pressure and the partial pressure—absorbance relational data, and
conducting the zero calibration that updates the zero reference value based on the interference gas absorbance and the output value of the detector in the known concentration state,
wherein the light absorbance analysis apparatus conducts the zero calibration on the detector even when the interference gas exists in the measurement area of the detector.

* * * * *